United States Patent [19]
Giesey et al.

[11] Patent Number: 6,003,922
[45] Date of Patent: Dec. 21, 1999

[54] ARRANGEMENT FOR MOUNTING A SPARE TIRE AND A LICENSE PLATE CARRIER TO A MOTOR VEHICLE

[75] Inventors: Jennifer L. Giesey, Howell; Jeffrey M. Niemi, Milford; Vernon J. Scott, Milford; Duane A. Spytman, Farmington Hills; Lavern D. Schmidt, Jr., Ottawa Lake; Bryan R. Moore, Canton; Robert E. Litwin, Plymouth; E. Mackey King, Brighton, all of Mich.

[73] Assignee: DaimlerChrysler Corporation, Del.

[21] Appl. No.: 09/361,925

[22] Filed: Jul. 27, 1999

[51] Int. Cl.⁶ .................................................. B62D 43/02
[52] U.S. Cl. ........................ 296/37.3; 224/42.21; 40/211
[58] Field of Search ............................. 296/37.3; 40/200, 40/211, 209; 224/42.21

[56] References Cited

U.S. PATENT DOCUMENTS

| | | |
|---|---|---|
| 1,542,107 | 1/1999 | Sutherland ........................... 224/42.21 |
| 1,974,599 | 1/1934 | Bradford ............................ 224/42.21 |
| 3,755,945 | 9/1973 | McEwen et al. . |
| 3,867,776 | 2/1975 | Drummond et al. . |
| 3,877,264 | 4/1975 | Foglietti et al. . |
| 3,905,637 | 9/1975 | Smith . |
| 3,915,491 | 10/1975 | Montgomery . |
| 4,011,675 | 3/1977 | Herring . |
| 4,257,642 | 3/1981 | Sampson . |
| 4,357,650 | 11/1982 | Kano . |
| 4,406,490 | 9/1983 | Torii et al. . |
| 4,413,803 | 11/1983 | Ross . |
| 4,537,437 | 8/1985 | Buccola . |
| 4,891,895 | 1/1990 | DeLaquil, Jr. . |
| 4,917,426 | 4/1990 | Copp . |
| 4,971,237 | 11/1990 | Davis ................................. 224/42.21 |
| 5,012,602 | 5/1991 | Storey . |
| 5,076,629 | 12/1991 | Peters et al. . |
| 5,104,015 | 4/1992 | Johnson ............................. 224/42.21 |
| 5,156,455 | 10/1992 | Kuo . |
| 5,183,192 | 2/1993 | Mrozowski et al. ................. 224/42.21 |
| 5,469,998 | 11/1995 | Van Dusen et al. ................. 224/42.21 |
| 5,568,136 | 10/1996 | Hochstein et al. . |
| 5,608,391 | 3/1997 | Bantli et al. . |
| 5,657,008 | 8/1997 | Bantli . |
| 5,730,338 | 3/1998 | Travis . |
| 5,791,533 | 8/1998 | Neag et al. . |
| 5,815,965 | 10/1998 | de Greeve . |
| 5,842,730 | 12/1998 | Schneider et al. . |
| 5,870,841 | 2/1999 | Brody, II et al. . |

OTHER PUBLICATIONS

U.S. application No. 08/847,265, filed May 1, 1997, Hutter et al.

U.S. application No. 08/972,487, filed Nov. 18, 1997, Yu et al.

U.S. application No. 09/131,622, filed Aug. 10, 1998, Grabowski et al.

*Primary Examiner*—Gary C. Hoge
*Attorney, Agent, or Firm*—Marc Lorelli

[57] ABSTRACT

An arrangement for mounting a spare tire and a license plate to a motor vehicle. The license plate mount includes a base member connected to an external panel of the vehicle, a display cover adapted to be normally parallel and spaced from the external panel to allow a spare tire to be positioned therebetween, and a linkage connecting the display cover to the base member to allow the display cover to articulate about a hinge point for providing access to a spare tire.

23 Claims, 4 Drawing Sheets

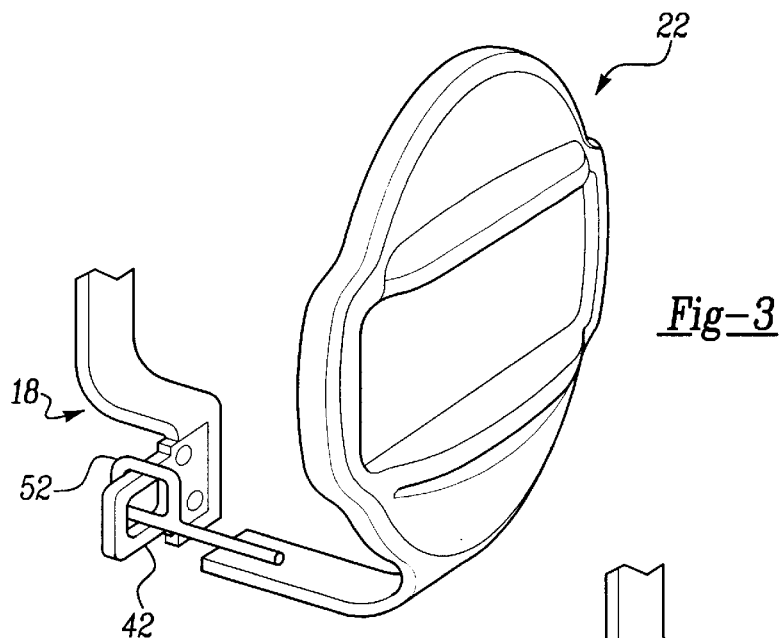
_Fig-3_
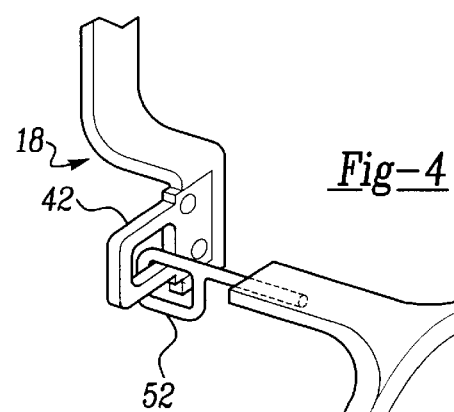
_Fig-4_
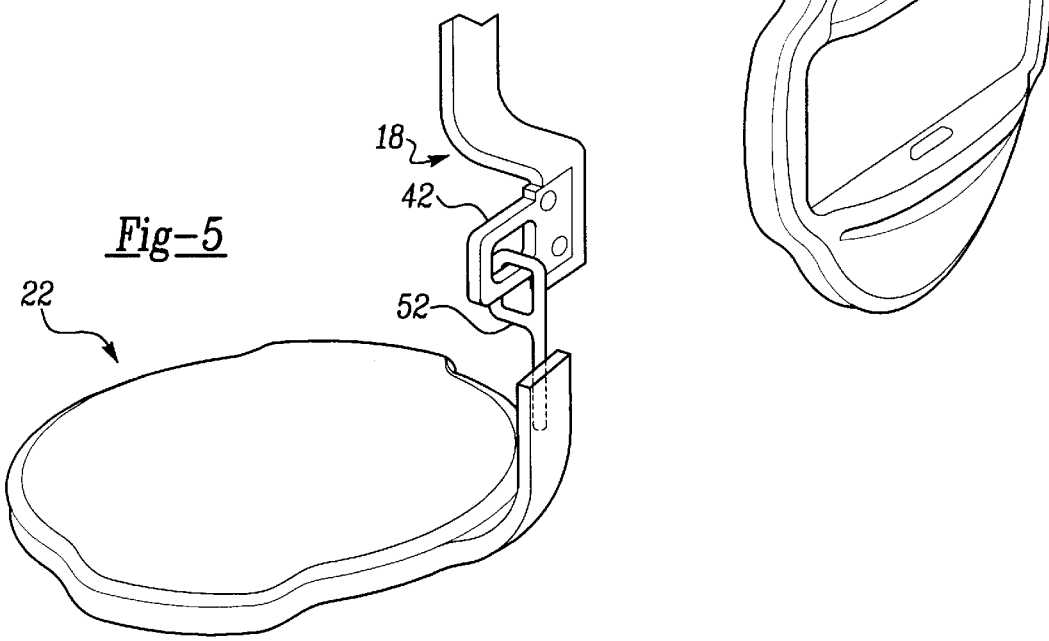
_Fig-5_

ARRANGEMENT FOR MOUNTING A SPARE TIRE AND A LICENSE PLATE CARRIER TO A MOTOR VEHICLE

BACKGROUND OF THE INVENTION

1. Technical Field

The present invention generally pertains to motor vehicles. More particularly, the present invention pertains to an arrangement for mounting a spare tire and a license plate to a motor vehicle. More specifically, but without restriction to the particular embodiment and/or use which is shown and described for purposes of illustration, the present invention relates to a spare tire and license plate mounting arrangement for a motor vehicle which incorporates a license plate module that allows for an alternative method of permanently attaching a license plate to a spare tire carrier mounted to the gate.

2. Discussion

It is well known in the motor vehicle field to mount a spare tire to a rear panel. This spare tire mounting technique is commonly employed for sport utility vehicles and the like which do not have a conventional trunk for storage. By mounting the spare tire to the exterior surface of a rear gate, the interior of the vehicle is not encumbered by the tire. Additionally, access problems associated with mounting the spare tire to an underside of the frame are avoided.

Conventional mounting of a spare tire to the gate presents two concerns. First, the area for mounting of a license plate is effectively reduced. This concern becomes particularly problematic in view of today's global marketplace. In this regard, it is desirable that a motor vehicle accommodate all export license plate sizes and satisfy homologation requirements directed to license plate location and attachment to the vehicle. Secondly, a rear mounted spare tire may detract from vehicle styling. Thus, in addition to providing a suitable area for license plate mounting, it is also desirable to at least partially conceal the spare tire and thereby present an improved aesthetic appearance while permitting easy access to the spare tire.

One device addressing these concerns is generally disclosed in U.S. patent application Ser. No. 09/131,622, entitled "LICENSE PLATE CARRIER FOR A MOTOR VEHICLE," filed on Oct. 10, 1998 to Grabowski, et al. and assigned to the assignee of the present application and is hereby incorporated by reference. The '622 application generally provides an apparatus for mounting a license plate to a motor vehicle which attaches the license plate to a mounting portion pivotally interconnected to the motor vehicle. The pivotally interconnected mounting portion allows the license plate to be selectively moved to allow access to a spare tire. However, because of the structure of the pivotal interconnection, the mounting portion can impede access to the spare tire when it is in the open position. The present invention was developed in light of these drawbacks.

SUMMARY OF THE INVENTION

It is a general object of the present invention to provide a spare tire and license plate mounting arrangement which overcomes the disadvantages associated with the prior art, including but not limited to those discussed above.

It is a more particular object of the present invention to provide an apparatus for use on a motor vehicle having a spare tire mounted to a rear surface thereof which accommodates various license plate sizes and satisfies homologation requirements relating to the display cover of the license plates while also covering the tire and permitting easy access to the tire.

In one form, the present invention provides a license plate mount which attaches to an external panel of a vehicle. The license plate mount has a base member, supporting the spare tire, which is adapted to be connected to the external panel. The license plate mount further has a display cover defining a mounting surface for receiving the license plate. A support member is provided which connects the display cover to the base member. This connection is at a hinge point for allowing the display cover to articulate relative to the base member about a plurality of axes.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

In the drawings which illustrate the best mode presently contemplated for carrying out the present invention:

FIG. 3 is a perspective view illustrating a first position of the spare tire and license plate mounting arrangement of the preferred embodiment of the present invention.

FIG. 4 is a perspective view illustrating a second position of the spare tire and license plate mounting arrangement the preferred embodiment of the present invention.

FIG. 5 is a perspective view illustrating a third or intermediate position of the spare tire and license plate mounting arrangement of the preferred embodiment of the present invention.

DETAILED DESCRIPTION OF THE PREFERRED EMBODIMENT

Figure 1:
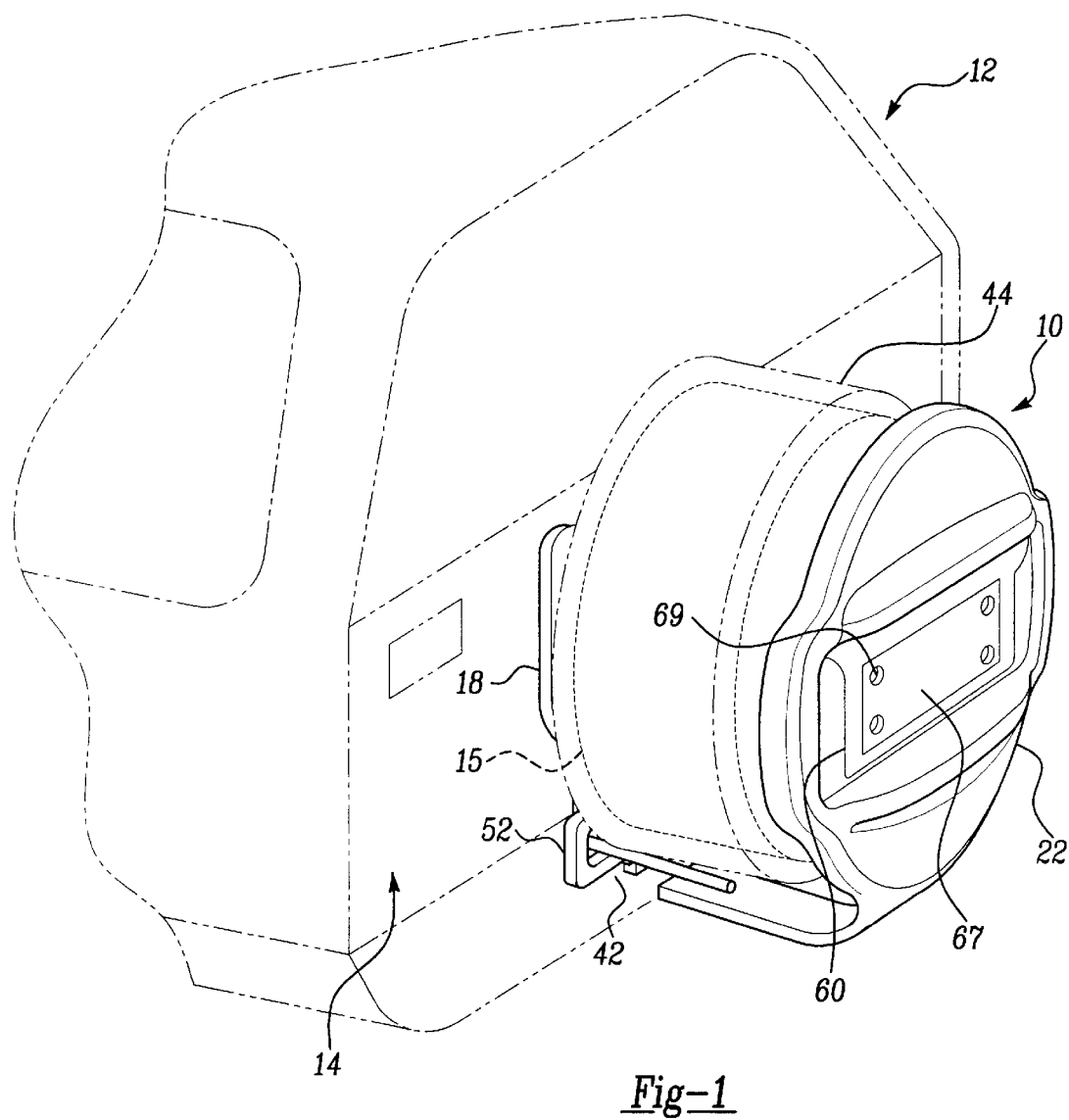
FIG. 1 is a perspective view illustrating a spare tire and a license plate mounting arrangement constructed in accordance with the teaching of a preferred embodiment of the present invention operatively installed on a motor vehicle.

With initial reference to the environmental view of FIG. 1, an arrangement for mounting a spare tire and a license plate to a motor vehicle constructed in accordance with the teachings of a preferred embodiment of the present invention is generally identified with reference numeral 10. The system 10 of the present invention is shown operatively associated with a motor vehicle 12 having a rear gate 14 and a spare tire 15. It will be understood by those skilled in the art that the particular vehicle 12 shown is merely exemplary and that the teachings of the present invention have applicability to a wide range of vehicles.

Figure 2:
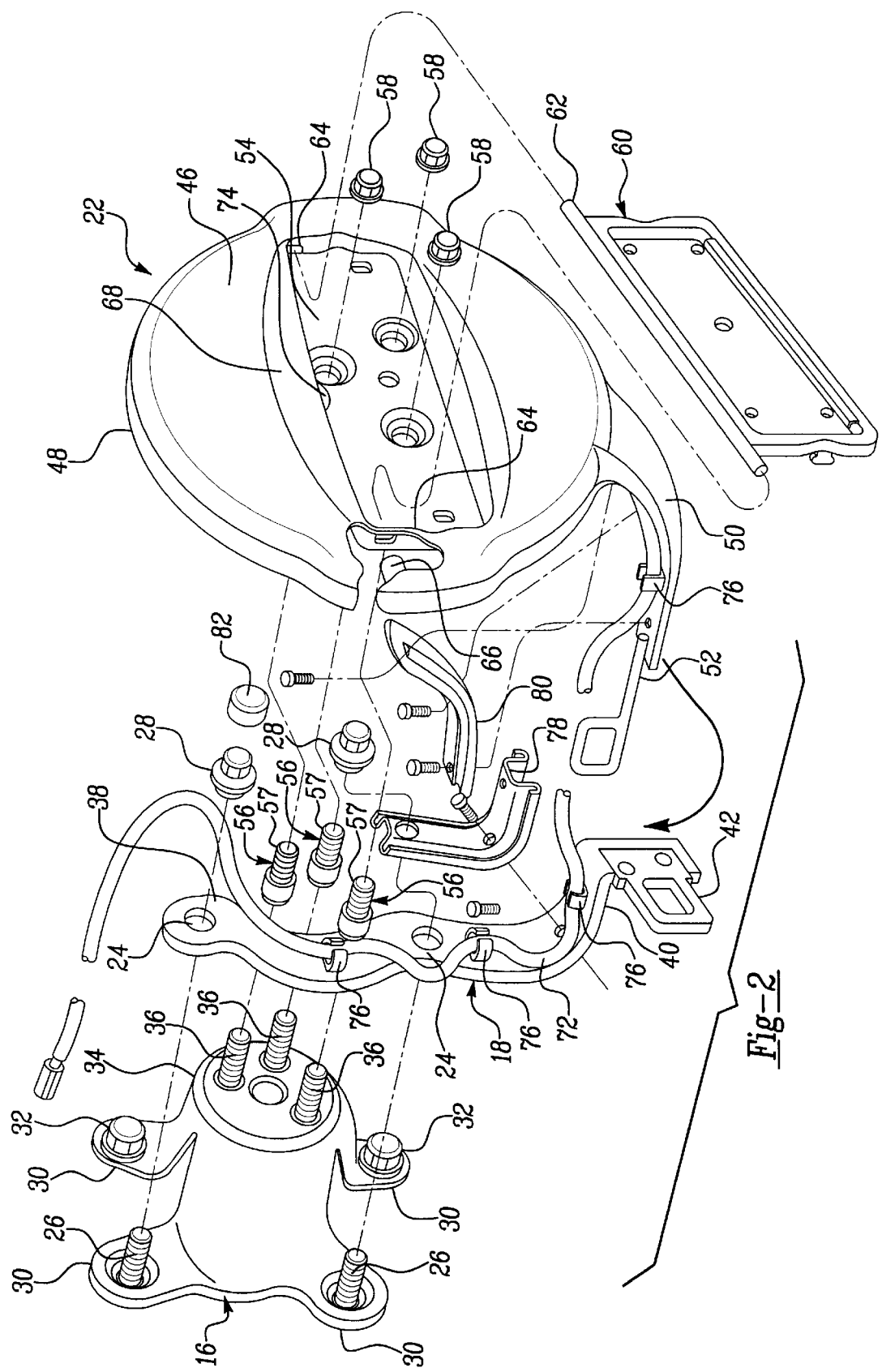
FIG. 2 is an exploded view illustrating the spare tire and license plate mounting arrangement constructed in accordance with the teachings of a preferred embodiment of the present invention shown enlarged and partially cut-away.

With continued reference to FIG. 1 and additional reference to the exploded view of FIG. 2, the arrangement of the present invention is shown to generally include a base member 16, a support member 18, and a display cover 22. Base member 16 includes four foot portions 30 which permanently attach base member 16 to rear gate 14 by bolts or other attachment means. Preferably, each foot portion 30 has an aperture (not specifically shown) therein for receiving a respective bolt 32 or threaded shaft 26. Base member 16 rearwardly extends from foot portions 30 in a cylindrical fashion until meeting a vertically oriented face 34. A plurality of threaded rods 36 protrude from face 34 of base member 16 and extend thereback away from gate 14. Bolts 32 act to secure base member 16 to gate 14. Threaded shafts 26 are used for reasons which will be discussed.

As is shown most particularly in FIG. 2, support member 18 is generally L-shaped having one portion 38 oriented substantially parallel with gate 14, and a second portion 40 extending back from gate 14 and terminating with a loop 42. Support member 18 includes a pair of circular apertures 24 each adapted to receive one of threaded shafts 26. Mounting lugs 28 thread to threaded shafts 26, thereby securing support member 18 to base member 16. Security cap 82 snaps over one or both lugs 28 to render them permanently attached.

Display cover 22 includes a generally circular overall shape defining a front portion 46 and a peripheral edge 48. A connection member 50 is formed integrally with display cover 22 and extends from edge 48 out toward gate 14. At an end of connection member 50, distally located from display cover 22, is fashioned a second loop 52. Second loop 52 is constructed of metal and secured to connection member 50 in a known manner. Second loop 52 is interconnected with loop 42 so as to define a hinge point about which display cover 22 is permitted to pivot. The interconnection between first and second loops 42 and 52 is preferably permanent and may be accomplished by known processes such as heatstaking. As a result, the permanent interconnection and permanent attachment of base member 16 to rear gate 14 satisfies certain homologation requirements directed to permanent interconnection of these components.

In the exemplary embodiment, first loop 42 is defined by a generally planar portion of support member 18 which is oriented parallel to a plane defined by rear gate 14. The second loop 52 extends generally perpendicular to the plane defined by rear gate and is oriented substantially horizontal (when display cover 52 is in its normally upright position, as shown in FIG. 1).

Front portion 46 of display cover 22 generally includes a license plate mounting portion 54 which is adapted to be normally oriented parallel to gate 14. Mounting portion 54 defines three circular apertures each configured to receive a lug 56. At an end distally located from display cover 22, lugs 56 threadably engage threaded rods 36. Nuts 58 threadably engage an externally threaded shaft portion 57 of lugs 56, which are secured to threaded rods 36, in turn securing display cover 22 to threaded rods 36.

The present invention further includes a license plate holder 60 which is generally rectangular in shape. License plate holder 60 has a pivot arm 62 at its upper horizontal edge. The ends of pivot arm 62 extend through apertures 64 provided in display cover 22 and are each rotationally interconnected with a bushing 66 (one of which is shown in FIG. 1). Bushings 66 allow license plate 60 to rotate about pivot arm 62 and allow access to nuts 58. As will be discussed below, it may be desirable to incorporate a spring or similar mechanism for downwardly biasing license plate holder 60. A license plate 67 (shown in FIG. 1) is conventionally secured to license plate holder 60 with a plurality of threaded fasteners 69. Alternatively, license plate holder 60 may be eliminated in favor of direct attachment of license plate 67 to display cover 22.

Front portion 46 includes a rearwardly extending flange 68 disposed superjacent the mounting portion 54. A lamp 74, which is conventionally inserted into the rearwardly extending flange 68, is carried within the rearwardly extending flange 68 for illuminating the license plate holder 60. A wire harness 72 supplies electrical power to lamp 74 from the vehicle's electrical system (not shown) in a conventional manner. A plurality of clamps 76 maintain wire harness 72 snugly against connection member 50 and support member 18. A pair of cover supports 78 and 80 attach to support member 18 and connection member 50, respectively, to encapsulate wire harness 72 for aesthetic purposes.

In one application, support member 18 and display cover 22 are both injection molded of a thermoplastic material. Alternatively, it will be understood that these components can be constructed of metal or other suitable, substantially rigid material.

Figure 6:
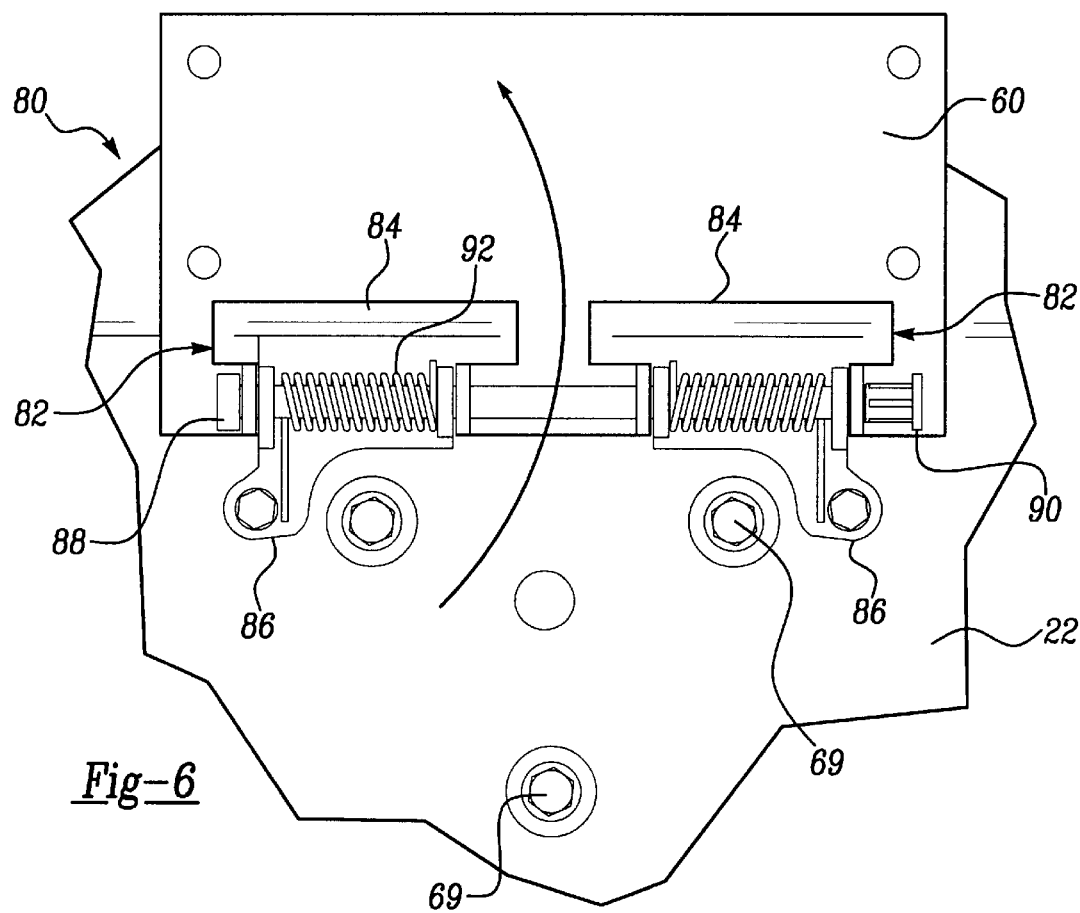
FIG. 6 is a perspective view of an alternative arrangement for attaching the license plate 67 to the display cover.

With reference to FIG. 6, an alternative arrangement is shown for mounting the license plate 67 to the display cover 22. The alternative arrangement is identical to the embodiment described with reference to FIGS. 1–5 with the exception that the license plate holder 60 is pivoted to a downward position (as shown in FIG. 1) so as to cover the nuts 69. The arrangement for mounting a spare tire and a license plate 10 incorporates a spring bias arrangement 80 for this purpose. FIG. 6 shows the alternative arrangement with the license plate holder 60 rotated to an upward position.

In the embodiment illustrated, the arrangement includes a pair of hinges 82. In the exemplary embodiment, the hinges 82 are substantial mirror images of one another about a vehicle centerline. Each hinge is shown to include a first portion 84 attached to the license plate holder 60 and a second portion 86 attached to the display cover 22. The first and second portions 84 and 86 are pivotally connected in a conventional manner with a pin 88. The longitudinally extending axis of the pin defines a pivot axis for the license plate holder 60 relative to the display cover 22. A rivet 90 is secured to a distal end of the pin 88. In a known manner, the pin 88 extends through apertures (not shown) provided in flanges of both of the members 84 and 86. Each of the hinges 82 is shown operatively associated with a biasing member preferably illustrated as a torsion spring 92. The torsion spring conventionally functions to bias the license plate holder 60 to its downward position.

With reference to FIGS. 2 through 5, the operation of the present invention will now be described. In FIG. 2, display cover 22 is releasably maintained in an upright position, parallel to gate 14, by nuts 58 secured to lugs 56. As such, display cover 22 and support member 18 define a L-shape which allows spare tire 44, supported by threaded rods 36, to be positioned therebetween. When spare tire 44 is to be removed from threaded rods 36, license plate holder 60 is rotated upward on pivot arm 62. Nuts 58 are then removed from lugs 56. As such, display cover 22 is then rotated approximately 180° counterclockwise, about a horizontal axis parallel with a longitudinal axis of vehicle 12, from the position as shown in FIG. 3, thereby allowing second loop 52 to rotate along the periphery of first loop 42 until ending at the position as shown in FIG. 4. From here, display cover 22 and first loop 42 is rotated about a horizontal axis perpendicular to the longitudinal axis of vehicle 12, thereby positioning display cover 22 under gate 14 as shown in FIG. 5. Significantly, movement of display cover 22 relative to vehicle 12 is not limited to pivotal movement about a fixed axis. Rather, the interconnection between first and second loops 42 and 52 allows for substantial universal movement of display cover 22 relative to vehicle 12. This connection allows for maneuvering display cover 22. With display cover 22 disengaged from spare tire 44, lugs 56 can be accessed and removed from threaded rods 36. Removal of lugs 56, which normally act to maintain spare tire 44 in position, allows spare tire 44 to be removed from threaded rods 36.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An arrangement for mounting a license plate and a spare tire to an external panel of a motor vehicle in combination with the spare tire, the arrangement comprising:
   a base member adapted to be connected to the external panel, said base member supporting the spare tire;
   a display cover defining a mounting surface for receiving the license plate; and
   a support member connecting said display cover to said base member, said support member connected to said display cover at a hinge point for allowing said display cover to articulate relative to said base member about a plurality of axes.

2. The arrangement for mounting a license plate and a spare tire to a motor vehicle as claimed in claim 1, wherein said hinge point is disposed below the spare tire.

3. The arrangement for mounting a license plate and a spare tire to a motor vehicle as claimed in claim 1, wherein said support member is connected to said display cover so as to allow said display cover to rotate about a horizontally extending pivot axis.

4. The arrangement for mounting a license plate and a spare tire to a motor vehicle as claimed in claim 2, wherein said display cover includes a circular portion and a connection member downwardly and rearwardly extending from said circular member, said connection member interconnected to said support member.

5. The arrangement for mounting a license plate and a spare tire to a motor vehicle as claimed in claim 2, wherein said support member is generally L-shaped having a first arm secured to said base member and a second arm interconnected to said display cover.

6. The arrangement for mounting a license plate and a spare tire to a motor vehicle as claimed in claim 4, wherein said support member includes a first loop and said connection member includes a second loop, said first and second loops being interconnected.

7. The arrangement for mounting a license plate and a spare tire to a motor vehicle as claimed in claim 1, wherein said hinge point allows said display cover to rotate relative to said base member about a plurality of non-parallel axes.

8. A motor vehicle comprising:
   a rear gate;
   a base member attached to said rear gate, said base member having a support member extending therefrom;
   a spare tire supported by said base member;
   a display cover having a license plate mounting surface; and
   a hinge point linking said support member to said display cover to allow said display cover to rotate about a plurality of axes for providing access to a spare tire supported by said base member.

9. The motor vehicle as claimed in claim 8, wherein said hinge point is disposed below the spare tire.

10. The motor vehicle as claimed in claim 8, wherein said hinge point allows universal movement between said display cover and said base member.

11. The motor vehicle as claimed in claim 9, wherein said display cover includes a circular portion and a connection member downwardly and rearwardly extending from said circular portion member, said connection member interconnected to said support member.

12. The motor vehicle as claimed in claim 9, wherein said support member is generally L-shaped having a first arm secured to said base member and a second arm interconnected to said display cover.

13. A motor vehicle as claimed in claim 11, wherein said support member includes a first loop and said connection member includes a second loop, said first and second loops being interconnected.

14. The motor vehicle as claimed in claim 8, wherein said hinge point allows said display cover to rotate relative to said base member about a plurality of non-parallel axes.

15. A motor vehicle comprising:
   a body including a rear gate;
   a base member attached to said rear gate;
   a spare tire supported on said base member;
   a display cover disposed rearward of said spare tire such that said spare tire is positioned interbetween said display cover and said rear gate;
   a hinge point fixedly interconnecting said base member and said display cover, said hinge point operable to articulate said display cover in a first position when said spare tire is stored on said base member and a second position when access to said spare tire is required, said display cover oriented substantially parallel to said rear gate in said first position and substantially perpendicular to said rear gate in said second position.

16. The motor vehicle as claimed in claim 15, further comprising a license plate carried by said display cover.

17. The motor vehicle as claimed in claim 15, wherein said hinge point is further operable to articulate said display cover to an intermediate position in which said display cover is inverted and oriented substantially parallel to said rear gate.

18. The motor vehicle as claimed in claim 17, wherein said display cover is rotatable about an axis substantially parallel to a longitudinal axis of the motor vehicle between said first position and said second position.

19. The motor vehicle as claimed in claim 17, wherein said display cover is rotatable about an axis substantially perpendicular to a longitudinal axis of the motor vehicle between said intermediate position and said second position.

20. The motor vehicle as claimed in claim 19, wherein said display cover is positioned below said spare tire in said second position.

21. A motor vehicle comprising:
   a rear gate;
   a base member attached to said rear gate;
   a plurality of threaded members rearwardly extending from said base member;
   a spare tire supported by said base member;
   a display cover having a license plate mounting surface, said display cover defining a corresponding plurality of apertures for receiving said plurality of threaded members; and
   a corresponding plurality of nuts threadably engaging said plurality of threaded members for securing said display cover to said plurality of threaded members.

22. The motor vehicle of claim 21, further comprising a license plate mounting member pivotally attached to said display cover for providing access to said plurality of nuts.

23. The motor vehicle of claim 22, wherein said license plate mounting member is spring biased to a generally vertical position covering said plurality of nuts.

* * * * *